US012666209B2

(12) United States Patent
Greiner et al.

(10) Patent No.: US 12,666,209 B2
(45) Date of Patent: Jun. 23, 2026

(54) METHOD OF AN ELECTRONIC DEVICE FOR FILTERING INTERFERENCE

(71) Applicant: Widex A/S, Lynge (DK)

(72) Inventors: Søren Bredahl Greiner, Roskilde (DK); Rolf Asmund, Espergærde (DK)

(73) Assignee: WS Audiology A/S, Lynge (DK)

( * ) Notice: Subject to any disclaimer, the term of this patent is extended or adjusted under 35 U.S.C. 154(b) by 455 days.

(21) Appl. No.: 18/176,773

(22) Filed: Mar. 1, 2023

(65) Prior Publication Data

US 2024/0147171 A1 May 2, 2024

(30) Foreign Application Priority Data

Oct. 31, 2022 (EP) .................................... 22204661

(51) Int. Cl.
*H04R 25/00* (2006.01)

(52) U.S. Cl.
CPC ........... *H04R 25/70* (2013.01); *H04R 25/353* (2013.01); *H04R 25/40* (2013.01); *H04R 25/505* (2013.01); *H04R 25/554* (2013.01)

(58) Field of Classification Search
CPC ...... H04R 25/70; H04R 25/353; H04R 25/40; H04R 25/505; H04R 25/554; H04R 2225/49; H04R 25/43; H04B 15/005; G10L 2021/02085; G10L 21/0208; A61B 5/6817; A61N 1/0541; A61N 1/36036; A61N 1/375; A61F 11/08; A61F 2007/0005; A61F 2/18; G10K 2210/1081; G10K 11/002; G10K 11/004; G10K 11/162; G10K 11/17857; G10K 2210/3055; G10K 2210/3219; A61H 2205/027
USPC ........ 381/312, 322–331, 335–354, 355–361, 381/380–382, 386
See application file for complete search history.

(56) References Cited

U.S. PATENT DOCUMENTS

| | | | | |
|---|---|---|---|---|
| 8,989,415 | B2 | 3/2015 | Wilson | |
| 2009/0076825 | A1 * | 3/2009 | Bradford | H04R 25/554 704/271 |

(Continued)

FOREIGN PATENT DOCUMENTS

| | | | |
|---|---|---|---|
| EP | 3637800 | A1 | 4/2020 |

OTHER PUBLICATIONS

Bluetooth Core Specification Version 5.3 [online]. Bluetooth SIG Proprietary, 2021 [archived at web.archive.org on Feb. 16, 2022]. Retrieved from the internet <URL: https://web.archive.org/web/20220216004442/https://www.bluetooth.org/DocMan/handlers/DownloadDoc.ashx?doc_id=521059> (Year: 2021) (Year: 2021).*

(Continued)

*Primary Examiner* — Fan S Tsang
*Assistant Examiner* — Sean M Rinehart
(74) *Attorney, Agent, or Firm* — Sughrue Mion, PLLC

(57) ABSTRACT

A method of operating an electronic device, the device having a receiver for receiving a wireless analogue signal, a converter for converting the received analogue signal to a digital input signal, a signal processor for generating a digital output signal from the input signal, and a transmitter for transmitting the output signal as a wireless digital signal, wherein the input signal is filtered to generate the output signal such that a noise signal in the input signal generated by the signal processor and/or the transmitter is reduced.

11 Claims, 3 Drawing Sheets

Figure 1:
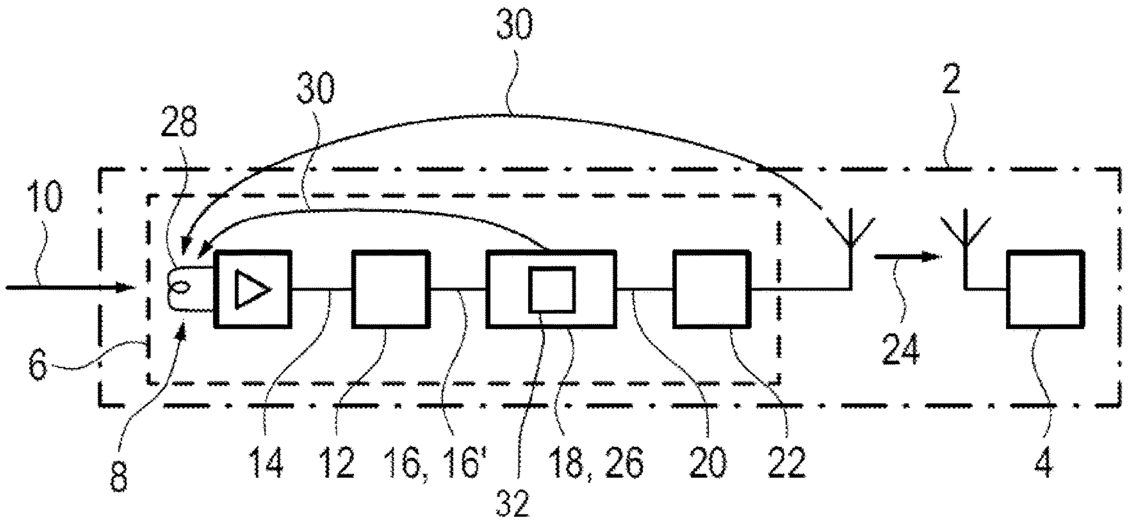

2: hearing system
4: hearing instrument
6: electronic device
8: receiver
10: analogue signal
12: converter or transducer
14: analogue signal
16: input signal
16': input signal
18: signal processor
20: output signal
22: transmitter
24: digital signal
26: controller
28: telecoil
30: noise
32: low pass filter/ IIR filter

(56) References Cited

U.S. PATENT DOCUMENTS

| | | | | |
|---|---|---|---|---|
| 2009/0147968 | A1* | 6/2009 | Inoda | G10L 21/0208 381/94.1 |
| 2009/0220114 | A1* | 9/2009 | Wilson | H04R 25/453 381/317 |
| 2012/0201173 | A1* | 8/2012 | Jain | H04B 1/56 370/277 |
| 2012/0250872 | A1* | 10/2012 | LeBlanc | H04M 9/082 381/71.1 |
| 2015/0350771 | A1* | 12/2015 | Konchitsky | G10L 21/0208 381/71.1 |
| 2020/0120413 | A1* | 4/2020 | Pedersen | H04R 25/554 |
| 2023/0403041 | A1* | 12/2023 | Hong | H04L 25/085 |

OTHER PUBLICATIONS

Extended European Search Report dated Aug. 21, 2023 in Application No. 23154121.0.

* cited by examiner

2: hearing system
4: hearing instrument
6: electronic device
8: receiver
10: analogue signal
12: converter or transducer
14: analogue signal
16: input signal
16': input signal
18: signal processor
20: output signal
22: transmitter
24: digital signal
26: controller
28: telecoil
30: noise
32: low pass filter/ IIR filter

METHOD OF AN ELECTRONIC DEVICE FOR FILTERING INTERFERENCE

The invention relates to a method for operating an electronic device. The invention further relates to an electronic device, a hearing system, and a software.

Hearing aids are portable hearing instruments that are used to provide hearing support to people who are hard of hearing or are hearing impaired. Other types of hearing instruments are designed to support the hearing of normal hearing users, i.e., to improve speech perception in complex acoustic situations. The term "hearing instrument" also includes a head-set, a noise-cancelling headphone or ear bud, etc.

In order to meet the numerous individual needs, different types of hearing aids are available, such as behind-the-ear hearing aids (BTE) and hearing aids with an external receiver (RIC: receiver in the canal) as well as in-the-ear hearing aids (ITE), for example also concha hearing aids or canal hearing aids (ITE: In-The-Ear, CIC: Completely-In-Channel, IIC: Invisible-In-The-Channel). The hearing aids listed as examples are worn on the outer ear or in the ear canal of a hearing aid user. In addition, bone conduction hearing aids, implantable or vibrotactile hearing aids are also available on the market. These stimulate the damaged hearing either mechanically or electrically.

The main components of such hearing aids are an input transducer, an amplifier and an output transducer. The output transducer is usually realised as an electro-acoustic transducer, for example as a miniature loudspeaker (earpiece), or as an electromechanical transducer, such as a bone conduction earpiece. The amplifier is usually integrated into a signal processing device. The input transducer is usually an acousto-electric transducer, such as a microphone, and/or an electromagnetic receiver, such as an induction coil or a telecoil.

A telecoil is preferably used to establish a wireless connection from the hearing aid to, e.g., a user's cellular telephone for telephoning, and/or, e.g., a wireless connection to an audio system in a cinema or theatre. The telecoil receives a wireless (non-acoustic) analogue signal which is converted via an ND-converter to an electric input signal for signal processing.

The term "hearing system" denotes one device or an assembly of devices and/or other structures providing functions required for the operation of a hearing instrument. A hearing system may consist of a single stand-alone hearing instrument. As an alternative, a hearing system may comprise a hearing instrument and at least one further electronic device, which may be, e.g., one of another hearing instrument for the other ear of the user, a remote control, a programming tool and an external input transducer for the hearing instrument. Moreover, modern hearing systems often comprise a software application for controlling and/or programming the hearing instrument, which software application is or can be installed on a computer or a mobile communication device such as a mobile phone (smartphone). In the latter case, typically, the computer or the mobile communication device are not a part of the hearing system. Most often, the computer or the mobile communication device will be manufactured and sold independently of the hearing system.

In order to reduce the number of components in a hearing instrument or in order to improve its functionality, certain functions of the hearing instrument can be out-sourced to an additional device of the hearing system, which is signal-technically coupled with the hearing instrument. This is especially advantageous for hearing aids, because the size of the hearing aid can be reduced, which increases wearing comfort and reduces visual visibility. For example, a telecoil can be implemented into the additional device external to the hearing instrument, such that the device receives wireless non-acoustic analogue signals and converts them into wireless non-acoustic digital signals, which are then transmitted to the hearing instrument.

Devices which feature a telecoil input for receiving external telecoil signals are very sensitive to the inherent noise generated by the telecoil input device. This noise can be especially significant in wireless devices that convert the analogue telecoil input to a digital stream and then transmit this signal as radio packages on periodic intervals. Since the noise generated by a wireless digital signal can be broadband with many frequencies that are multiples of the period of the transmit interval or multiples of the current in the circuit due to CPU load of digital processors and microcontrollers the noise can be difficult to remove with simple digital linear filters such a low pass filters or notch filters.

Current solutions aim to reduce inherent noise in telecoil input devices by designing the electric circuits such that magnetic fields from PCB signals does not contribute to the telecoil signals. This can be obtained by careful routing, shielding cans and placement of electronic components, especially the telecoil receiver coil. Components that generate current spikes in the audible range e.g. 50 Hz to 5000 Hz can be redesigned to work in other frequencies outside the audible range, such as a PWM modulation of LED or PWM modulation in DC/DC converters.

Digital filters implemented after the telecoil signal has been sampled can include notch or FIR filters that aim to reduce narrow frequency bands where the telecoil noise is dominating, however this can also remove frequencies in the audible range and parts or the wanted telecoil signal.

The U.S. Pat. No. 8,989,415 B2 discloses a noise reduction method for a hearing aid, in which an input signal is split into at least two samples that are phase shifted to each other and are low pass filtered in order to estimate the noise in the input signal.

The invention is based on the task of providing a particularly suitable method for operating an electronic device. In particular, a method shall be specified in which a correlated static noise in an input signal caused by the electronics of the electronic device is cancelled out. The invention is further based on the task of providing a particularly suitable electronic device, a particularly suitable hearing system, and a particularly suitable software.

Advantages and embodiments cited with regard to the method of the present disclosure are transferable mutatis mutandis to the electronic device and/or the hearing instrument and/or the hearing system and/or the software and vice versa.

The conjunction "and/or" is to be understood here and in the following in such a way that the features linked by means of this conjunction can be formed both together and as alternatives to each other.

The method according to the invention is intended and designed for operating an electronic device.

In general, the term "electronic device" as used herein relates to an electronic component according to the invention that includes at least one receiver for receiving a wireless non-acoustic analogue signal, a converter or transducer for converting the received analogue signal into an electric input signal transporting the information, a signal processor for processing the input signal and generating an output signal, a transmitter for transmitting the output signal as a wireless digital signal.

According to the method the input signal is filtered to generate the output signal such that a noise signal in the input signal generated by the signal processor and/or the transmitter is reduced. The generation and transmission of the digital signal can cause magnetic fields which can couple into the receiver, and thereby generate an unwanted noise in the input signal, which in turn can cause a broadband noise in the digital signal. Since the noise is caused by the signal processor and/or the transmitter, it has a known period or frequency, because it is synchronized or correlated with the repetition rate of the generated digital signal. According to the invention a suitable filtering is used to remove said noise from the input signal, thereby decreasing the noise of the outputted digital signal.

In a conceivable embodiment the digital signal generated by the transmitter comprises a digital data stream transmitted via a wireless connection containing the audio information of the analogue signal (audio channel). This data stream is also referred to as audio streaming signal, since it contains acoustic or audio information. Optionally the electronic device can act as a remote for a coupled device, e.g. a hearing instrument. In this case, the digital signal additionally comprises control information (data connection channel/control channel), which is transmitted as a data connection signal. The digital signal therefore comprises an audio streaming signal with a first repetition period and a data connection signal with a second repetition period.

Preferably the second repetition period of the data connection signal, e.g. approximately 60 ms, is a multiple of the first repetition period of the audio streaming signal, e.g. approximately 10 ms (Milliseconds). In other words, the periodicity of the noise components are multiples of each other. Since the noise originates from the signal processor and/or the transmitter, this can be realized by choosing appropriate processor rates and sample rates for the signal processor and/or transmitter.

The noise comprises an audio streaming noise, synchronized or correlated with the first repetition period of the audio streaming signal of the digital signal, and a data connection noise, synchronized or correlated with the second repetition period of the data connection signal of the digital signal.

Filtering is understood here to mean in particular digital filtering, i.e. the application of a digital filter. A digital filter is especially a mathematical filter for manipulating a signal such as blocking or passing a certain frequency range.

In a preferred embodiment the filter is realized by separating the input signal into a number of time samples (time block, timeslot, signal block), wherein each time sample is filtered via a low pass filter to remove a corresponding noise component of the noise signal, and wherein afterwards the time samples are recombined to the output signal. A "number of time samples" means at least two time samples, preferably more than 10 time samples, especially more than 100 time samples, for example 160 time samples.

Preferably the number of time samples is determined by the product of a periodicity of the noise signal and a sample rate of the receiver. This guarantees, that the number of time samples matches with the periodicity of the noise signal, such that for each time sample the signal component can be treated as a DC signal, such that the low pass filter can remove the noise component.

The noise signal essentially comprises two signal components, the data connection noise and the audio streaming noise, which differ in their periodicity. It is conceivable, that each noise signal component is matched with a corresponding number of time bins. Preferably the number of time samples is determined by the product of the longer periodicity noise signal component, especially the periodicity of the data connection noise, and the sample rate of the receiver. In an embodiment in which the periodicities of the noise components are approximately multiples of each other, using the longer periodicity for determining the number of time bins ensures, that both noise components can be suppressed via the low pass filters.

For example, for a noise signal with an audio streaming noise with a periodicity of approximately 10 ms and a data connection noise with a periodicity of approximately 60 ms, and a receiver with a sample rate of 16 kHz (Kilohertz), the number of time samples would be 960 (60 ms×16 kHz).

The (digital) filter exploits that part of the (inherent) noise in the input signal is exactly synchronized and periodic with N samples in the digital stream of the wireless digital signal, where N is a whole number. According to this embodiment N low pass filters are implemented one for each timeslot in an audio block of N samples to discriminate between periodic noise and the desired signal. Preferably the low pass filters are digital filters.

In an advantageous embodiment the low pass filters estimate the noise component of the noise signal and subtract them from the respective time sample. The periodic noise in the telecoil signal of sample rate SR can be estimated as a block or N samples that are subtracted from the input signal, because each sample in a new audio block of N samples can be regarded as an independent signal with the sample rate SR/N.

The noise suppression can be made more robust by using different time constants in the low pass filters dependent on the magnitude of the input signal. In a possible embodiment two types of low pass filters differing in their time response (time constants) are provided, wherein the root mean square (RMS) value of the input signal is calculated, and compared with a stored threshold value. If the RMS value reaches or exceeds the threshold value, the low pass filters with slower response time are used.

When the input signal is small and consequently the noise relatively large, then fast time coefficients are advantageous. As one example the time constant can be 1 s (second). Consequently, the noise will be suppressed with 6 dB (Decibel) and after e.g. 5 s the noise will be suppressed with 40 dB. On the other hand, when the input signal is large, and consequently the noise relatively small, slow time constants are preferred in order to ensure that the input signal does not impart the estimate of the noise. Thus, consequently time constants of e.g. 60 s can be used. This ensures that even in case of a relative constant large telecoil signal the noise is still slowly suppressed. Furthermore, the noise is in this case relatively difficult to hear because it is low compared to the input signal. The RMS value of the input signal is used as gauge whether the input signal is small or large. The RMS of the input signal is calculated, and if the RMS for a given signal block exceeds a threshold the slow filters are used and otherwise fast filters are used instead.

In an additional embodiment the filter coefficients for filtering the input signal are varied depending on the RMS value of the input signal. In other words, the filter coefficients are adaptively changed dependent on the signal RMS. Therefore, instead of having (only) two different sets of low pass filters/filter coefficients, an adaptive and smooth transition between slow and fast filters is provided, which makes the method more robust against variations in the background noise.

The electronic device according to the invention comprises a controller (i.e. a control unit).

The controller is here generally set up—in terms of programming and/or circuitry—to carry out the above-described method according to the invention. The controller is thus specifically set up to filter the input signal such that a noise signal in the input signal generated by the signal processor and/or the transmitter is reduced. In other words, the controller is designed as a digital filter. The digital filter can be implemented with logic devices such as ASICs, FPGAs or in the form of a sequential program with the signal processor.

In a preferred embodiment, the controller is formed at least in essence by a microcontroller having a processor and a data memory, in which the functionality for carrying out the method according to the invention is implemented programmatically in the form of operating software (firmware), so that the method is carried out automatically—if appropriate in interaction with a device user—when the operating software is executed in the microcontroller. Alternatively, within the scope of the invention, the controller can also be formed by a non-programmable electronic component, such as, for example, an application-specific integrated circuit (ASIC) or by an FPGA (field programmable gate array), in which the functionality for carrying out the method according to the invention is implemented by circuit-technical means.

The hearing system according to the invention comprises an electronic device described above. The hearing instrument can be a hearing aid.

In a conceivable embodiment the hearing system comprises a hearing instrument and the electronic device, i.e. the electronic device is separate or external to the hearing instrument.

The electronic device can be a second hearing instrument or hearing aid, i.e. the hearing system is e.g. a binaural hearing aid system. In a preferred design, the electronic device is a multi-function device which is signal-technically coupled or can be coupled with the hearing instrument. The electronic device can be designed to improve communication through partner and table microphone functionality, hands free phone calls, direct streaming from surrounding devices (e.g. via Bluetooth) to the hearing aid and remote control of the hearing instrument.

An additional or further aspect of the invention provides for software on a medium or data carrier for carrying out or executing the method described above when the software runs on a computer or processor. Thus, a particularly suitable software for the operation of an electronic device is realised, with which the functionality for carrying out the method according to the invention is implemented programmatically. The software is thus in particular an operating software (firmware), whereby the data carrier is, for example, a data memory of the controller.

The invention is explained in more detail below with reference to a drawing.

Figure 2:
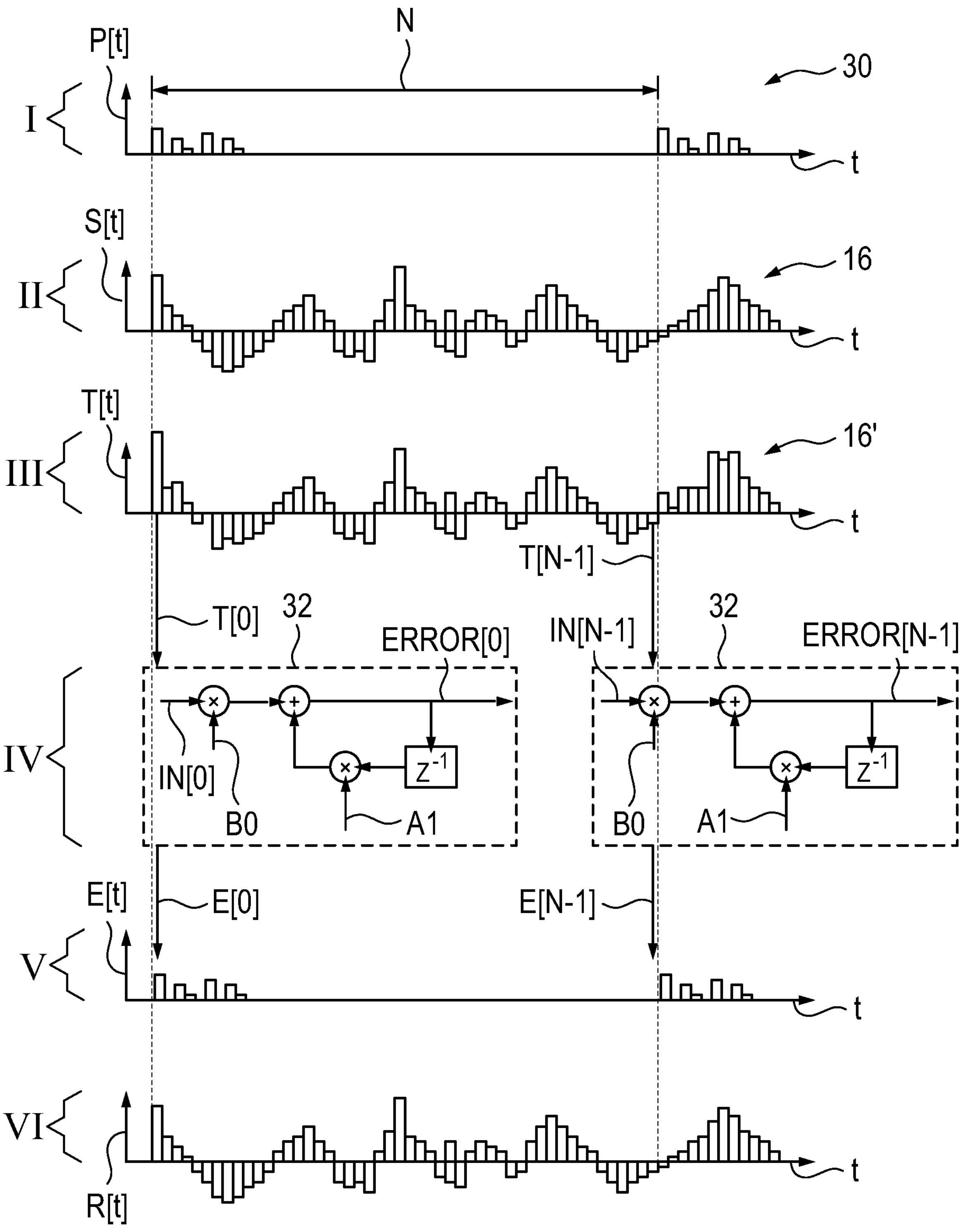
Figure 3:
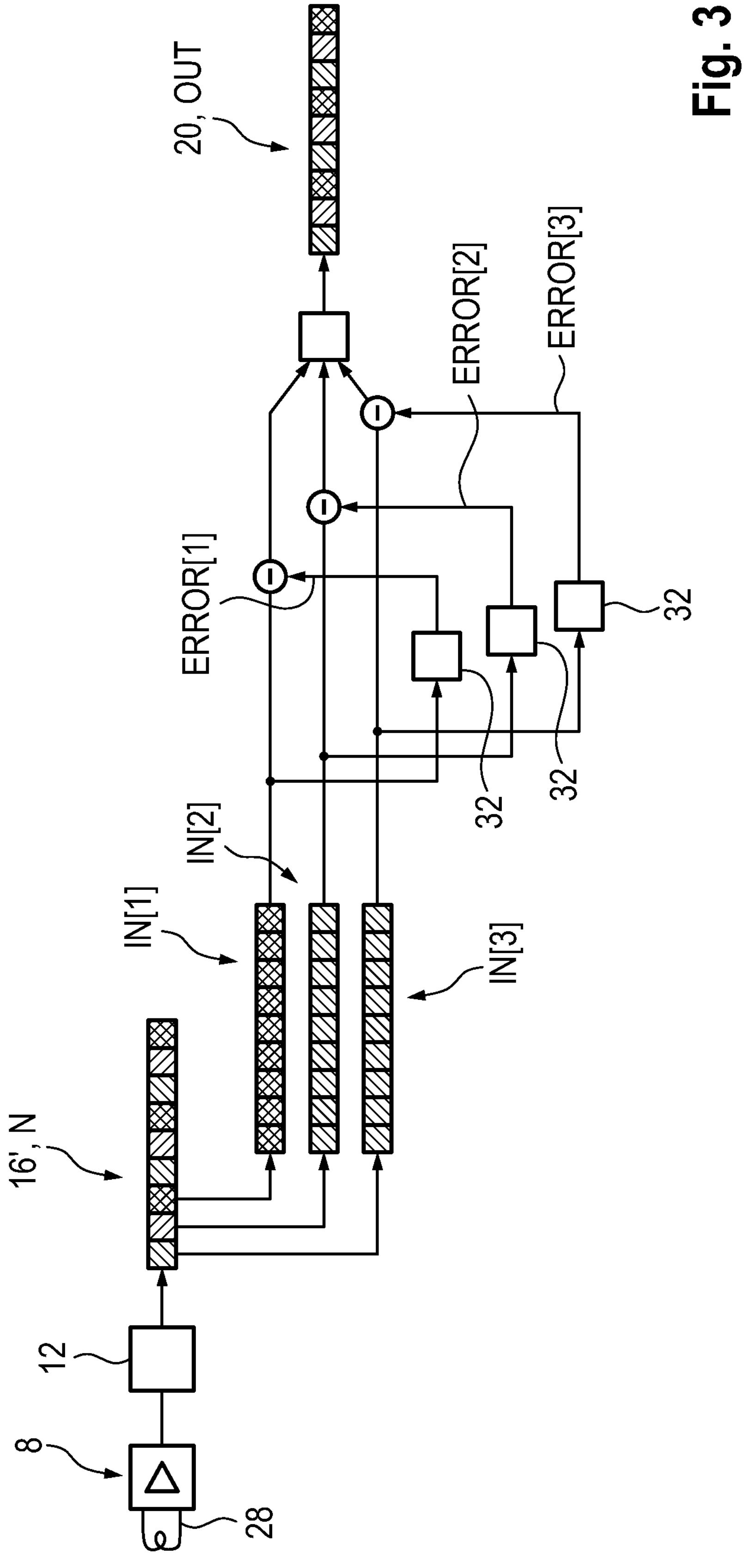

FIG. 1 shows a hearing system with a hearing instrument and an additional device, and FIGS. 2 and 3 each show a diagram for a method of operating the device.

Corresponding parts and features are always marked with the same reference signs.

FIG. 1 shows in a schematic a simplified representation a hearing system 2 comprising a hearing instrument 4 and an electronic device 6.

The electronic device 6 includes at least one receiver 8 for receiving a wireless non-acoustic analogue signal 10, a converter or transducer 12, especially an A/D-converter, for converting the received analogue signal 14 into an electric (digital) input signal 16 transporting the information, a signal processor 18 for processing the input signal 16 and generating an output signal 20, a transmitter 22 for transmitting the output signal 20 as a wireless digital signal 24, and a controller 26, which can be integrated in the processor 18.

The hearing instrument 4 is preferably designed as a hearing aid worn on the outer ear or in the ear canal of a hearing aid user. The electronic device 6 can be a second hearing instrument or hearing aid, i.e. the hearing system 2 is e.g. a binaural hearing aid system. Preferably the electronic device 6 is a multi-function device which is signal-technically coupled with the hearing instrument 4.

The receiver 8 is especially a telecoil input device and comprises a telecoil 28. The analogue signal 10 is therefore preferably a telecoil signal used to establish a wireless connection from the hearing instrument 4 to, e.g., a user's cellular telephone for telephoning, and/or, e.g., a wireless connection to an audio system in a cinema or theatre.

The digital signal 24 generated by the transmitter is a digital data stream transmitted to the hearing instrument 4 via a wireless connection containing the audio information of the analogue signal 10 (audio channel). Optionally the electronic device 6 can act as a remote for the hearing instrument 4. In this case the digital signal 24 additionally comprises control information (data connection channel/control channel). The digital signal 24 therefore comprises an audio streaming signal with a first repetition period, e.g. approximately 10 ms (Milliseconds), and a data connection signal with a second repetition period, e.g. approximately 60 ms.

The generation and transmission of the digital signal 24 can cause magnetic fields which can couple into the receiver 8 or telecoil 28, and thereby generate an unwanted noise 30 in the input signal 16, which in turn can cause a broadband noise in the digital signal 24. The noise 30 has a known period or frequency, since it is synchronized or correlated with the repetition rate of the generated digital signal 24.

The noise 30 therefore comprises an audio streaming noise, synchronized or correlated with the first repetition period of the audio streaming signal of the digital signal 24, and a data connection noise, synchronized or correlated with the second repetition period of the data connection signal of the digital signal 24.

In the following input signal without noise 30 is referred with the reference sign 16, and the noisy input signal is referred with the reference sign 16'.

In the following, a method for operating the device 6 is explained in more detail with reference to FIG. 2 and FIG. 3, which reduced or completely eliminates the noise 30 from the input signal 14. The diagram in FIG. 2 comprises six horizontal sections I, II, III, IV, V, VI arranged one above the other. Time t is plotted horizon-tally, i.e. on the X or abscissa axis.

Insofar as process steps of the method are described below, advantageous de-signs for the electronic device 6 result in particular from the fact that it is designed to carry out one or more of these process steps. The method is carried out in particular by means of a software stored in the controller 26.

The software or the controller 26 preferably realize a digital filter, which exploits that part of the inherent noise 30 in the input signal 16 is exactly synchronized and periodic with N samples in the digital signal 24 where N is a whole number.

As an example, FIG. 2 shows one noise period of N samples. The samples for the periodic noise P[t] are shown in section I, the samples for the signal S[t] of the input signal 16 are shown in section II, and the samples for the telecoil signal T[t]=P[t]+S[t], i.e. the input signal 16', are shown in section III.

The periodic noise 30 is efficiently estimated. The periodic noise 30 in the telecoil signal of sample rate SR can be estimated as a block or N samples that are subtracted from the input signal 16', because each sample in a new audio block of N samples can be regarded as an independent signal with the sample rate SR/N.

The samples are each filtered via a low pass filter 32, such that the signal passing the filter 32 is the periodic noise 30 and the rest, i.e. the filtered or blocked part, is the signal 16. This is shown for the samples t=0 and t=N−1 in section IV. In other words, a static noise filter 32 removes the noise 30 that repeats after a fixed number of samples. For example 160 samples (10.24 ms) for the audio streaming signal and 960 samples (61.44 ms) for the data connection signal. In other words, the repetition is 160 samples of the radio audio noise, and 6*160 samples of the radio connection noise. Since the noise for each sample in a 160 sample can be considered a DC signal because the static noise is always repeating, one can isolate the noise 30 using a low pass filter 32. Preferably 960 samples are used, in order to filter both the audio streaming noise and the data connection noise.

The low pass filters 32 can be designed for recursive average filtering, preferably the low pass filters 32 are IIR filters (IIR: Infinite impulse response) and are also referred to as such below. The N number of IIR filters 32 that are run on each of the N samples in an audio block uses coefficients A1, B0 that allow the periodic noise 30 to vary very slowly over time but let any varying signals to pass through. The coefficients A1, B0 are chosen so that running the filter 32 over T seconds let the noise 30 be dampened by P dB, where T and P can be chosen by the de-signer.

In a pseudocode the filter 32 can in short form be described as:

```
// Removing error signal from signal
FOR each sample I in block of N samples
OUT[I] = IN[I] − ERROR[I]
END FOR
// Estimating error
FOR each sample I in block of N samples
ERROR[I] = A1*ERROR[I] + B0*IN[I]
END FOR
```

Where A1 and B0 are e.g. computed for each new audio IN-block from the RMS value (RMS: root mean squared) of the IN signal 16', using an exponential function with carefully selected constants. The error or ERROR (E[t] in section V of FIG. 2) of the output signal 20 (OUT) (reconstructed signal R[t]=T[t]— E[t] in section VI of FIG. 2) refers to the noise 30 in the sample. The output signal 20 is essentially the noise free or noise reduced signal 16.

The coefficient A1 is preferably smaller than 1 (A1<1), and the sum of the coefficients A1 and B0 is normalized (A1+B0=1). A1 determines the frequency response of the IIR filter 32.

In the following an example for the filter code written in C++ is shown:

```
void Process(int16_t* in, int16_t* out, int length)
{
  for(int j = 0; j < length; j++)
  {
    out[j] = in[j] − (int16_t)(error[index]);
    error[index] = a1*error[index] + b0*in[j];
    index++;
    if(index >= count)
    {
      index = 0;
    }
  }
}
// First order coefficients
float b0 = 0.06;
float a1 = 0.94;
int index;
int count;
float error [160*6];
```

The code above keeps an array of either 160 or 160*6 values that represents the estimated error (noise) for each of the samples in a 160 sample block or 160*6 sample block. The filter process function can be called with a set of samples, and the filter will update the error and compute the output signal which has the static noise removed.

FIG. 3 shows a simplified visualization of the method with three samples (N=3).

It is desirable to have a slow filter that very slowly isolates the error signal because the noise 30 is static and the wanted telecoil signal has a lowest frequency, which in general is larger than 50 Hz (Hertz). However, if the filter 32 is too slow, the time for the error to be determined will be so long, that the user of the hearing instrument 4 will hear the noise in the first seconds when the telecoil mode is entered. In a possible embodiment the reaction time can be dimensioned between 1 s (second) and 3 s, i.e. the noise is preferably determined faster than 1 s to 3 s.

The half time for the noise can calculated via:

$$\log(0.5)*L/\log(b0)/SR$$

where L is length of static signal in samples, and SR is the sample rate.

To eliminate the 10.24 ms noise of the audio streaming signal, one can choose (halftime ~0.7 s) the coefficient A1 (a1) as 0.01, and the coefficient B0 (b0) as 0.99. To eliminate the 61.44 noise of the data connection signal (halftime ~0.69 s), the coefficient A1 can be 0.06 and the coefficient B0 can be 0.94

In a preferred embodiment, an adaptive approach can be chosen, where the coefficients A1, B0 for the IIR filters 32 vary with the RMS value (root mean square) of the input signal 16'. Thus, the filter 32 will estimate the noise 30 faster when the signal 16 is low compared to the periodic noise 30, but estimate slower but with less artifacts on the output signal 20 when the signal RMS is high.

In the following an example for the static noise filtering program code (C++) is shown:

```
#ifndef __STATICNOISEFILTER_H__
#define __STATICNOISEFILTER_H__
```

-continued

```
#include "bufferpool.h"
#include "buffer.h"
/* CStaticNoiseFilter is an element for the AudioChain that can remove a static, repeating signal from the
 * desired signal. It is implemented as 'length' number of first order IIR-filters with coefficients 'a1' and 'b0'.
 *
 * Let say you have a systematically repeating humming noise added to your signal. Then you can remove this
 * humming, by using this filter, where 'length' is the number of samples before the humming noise repeats.
 * The filter values could be 'a1 = 0.9899' and 'b0 = 0.01'
 */
class CStaticNoiseFilterModel
{
public:
  virtual void calc(float rms, float& a1, float& b0) = 0;
};
class CStaticNoiseFilterModelExp : public CStaticNoiseFilterModel
{
public:
  CStaticNoiseFilterModelExp(float factor, float b0low, float b0high)
  {
    m_factor = factor;
    m_b0low = b0low;
    m_b0high = b0high;
  }
  void calc(float rms, float& a1, float& b0) override
  {
    b0 = exp(-rms*m_factor)*m_b0low + m_b0high; // factor = 0.015 b0low = 0.1 b0high = 0.0005
    a1 = 1.0f - b0;
  }
private:
  float m_factor;
  float m_b0low;
  float m_b0high;
};
template<typename PULLABLE, uint32_t MAX_LENGTH>
class CStaticNoiseFilter {
public:
  CStaticNoiseFilter(PULLABLE& dataPullable, CBufferPool& bufferPool) : m_dataPullable(dataPullable), m_bufferPool(bufferPool), m_bOpen(false) { }
  CBuffer<int16_t> pullOut(uint32_t size)
  {
    CBuffer<int16_t> inBuff = m_dataPullable.pullOut(size);
    CBuffer<int16_t> outBuff(m_bufferPool.getBuffer<int16_t>(inBuff.size( )));
    for (uint32_t j = 0; j < outBuff.size( ); ++j)
    {
      signal[m_n] = inBuff.mem( )[j];
      // Removing error signal from signal
      outBuff.mem( )[j] = inBuff.mem( )[j] - (int16_t)(error[m_n]);
      ++m_n;
      // Estimate the error and update coefficients when an entire block of m_length samples is ready
      if (m_n >= m_length)
      {
        m_n = 0;
        float squareSum = 0;
        for(uint32_t i = 0; i < m_length; ++i)
        {
          squareSum += signal[i]*signal[i];
        }
        m_rms = sqrt(squareSum/m_length);
        float a1, b0;
        m_pModel->calc(m_rms, a1, b0);
        // Estimating error
        for(uint32_t i = 0; i < m_length; ++i)
        {
          error[i] = a1*error[i] + b0*signal[i];
        }
      }
    }
    return outBuff;
  }
  template<typename MODEL, typename ...ARGS>
  void Open(uint32_t length, ARGS... args)
  {
    SYS_ASSERT(!m_bOpen);
```

-continued

```
    SYS__ASSERT(length <= MAX__LENGTH);
    static__assert(sizeof(MODEL) <= sizeof(m__aModelMem), "not enough mem
for model");
    m__n = 0;
    m__pModel = new (m__aModelMem) MODEL(args...);
    m__length = length;
    m__rms = 0.0f;
    memset(error, 0, MAX__LENGTH*sizeof(float));
    m__bOpen = true;
  }
  void Close( )
  {
    SYS__ASSERT(m__bOpen);
    m__bOpen = false;
  }
  float getSignalRms( ) const
  {
    return m__rms;
  }
private:
  PULLABLE& m__dataPullable;
  CBufferPool& m__bufferPool;
  bool m__bOpen;
  uint32__t m__n;
  uint32__t m__length;
  float m__rms;
  static constexpr size__t kModelMaxSize = MaxSize<CStaticNoiseFilterModelExp,
CStaticNoiseFilterModelFork, CStaticNoiseFilterModelDisabled >::value;
  char m__aModelMem[kModelMaxSize];
  CStaticNoiseFilterModel* m__pModel;
  float error[MAX__LENGTH];
  float signal[MAX__LENGTH];
};
#endif
```

The present disclosure is not limited to the embodiments described above. Rather, other variants of embodiments of the present disclosure may also be derived therefrom by the skilled person within the scope of the present disclosure without departing from the subject-matter of the present disclosure. In particular, all the individual features described in connection with the various embodiments can also be combined in other ways within the scope of the present disclosure without departing from the subject-matter of the present disclosure.

LIST OF REFERENCE SIGNS

2 hearing system
4 hearing instrument
6 electronic device
8 receiver
10 analogue signal
12 converter
14 analogue signal
16, 16' input signal
18 signal processor
20 output signal
22 transmitter
24 digital signal
26 controller
28 telecoil
30 noise
32 low pass filter/IIR filter

The invention claimed is:

1. A method of operating an electronic device, the electronic device including a receiver configured to receive a wireless analog signal, a converter configured to convert the received analog signal to a digital input signal, a signal processor configured to generate a digital output signal from the digital input signal; and a transmitter configured to transmit the digital output signal as a wireless digital signal, wherein the signal processor and/or the transmitter cause a noise signal in the digital input signal, which is synchronized or correlated with a repetition rate of the wireless digital signal, the method comprising:

generating the digital output signal by filtering the digital input signal, wherein the filtering comprises filtering the digital input signal such that the noise signal is reduced if the noise signal is caused by the signal processor, and if the noise signal is caused by the transmitter, and if the noise signal is caused by the signal processor and the transmitter, wherein the wireless digital signal includes an audio streaming signal with a first periodicity, and a data connection signal with a second periodicity, and the noise signal includes a corresponding audio streaming noise and data connection noise, wherein the filtering comprises:

dividing the digital input signal into a number of time samples;

applying, for each time sample, a low pass filter that removes a corresponding noise component in said time sample; and combining, after the applying, the time samples to the digital output signal, and wherein the number of time samples is the product of a periodicity of the noise signal and a sample rate of the receiver.

2. The method according to claim 1, wherein the applying comprises estimating, by the low pass filter, a noise component of the noise signal, and subtracting, by the low pass filter, the noise component that is estimated from the respective time sample.

3. The method according to claim 1, wherein the electronic device further includes a first low pass filter and a second low pass filter, the first low pass filter having a slower response time than a response time of the second low pass filter, and wherein the applying comprises:

calculating the root mean square value of the digital input signal;

determining that the root mean square value reaches or exceeds a threshold value; and filtering, based on the determining, the digital input signal with the first low pass filter having the slower response time.

4. The method according to claim 1, wherein the filtering further comprises varying filter coefficients for filtering the digital input signal based on the root mean square value of the digital input signal.

5. The electronic device according to claim 1, wherein the electronic device further comprises:

a controller configured to perform the method according to claim 1.

6. A hearing system comprising the electronic device according to claim 5.

7. The hearing system according to claim 6, comprising a hearing instrument and an additional device configured to be communicatively coupled to the hearing instrument, wherein the additional device is configured to receive wireless analog signals and forwards them as wireless digital signals to the hearing instrument, and wherein the additional device is the electronic device.

8. A non-transitory computer readable medium storing computer instructions, the computer instructions configured to, when executed by at least one processor, cause the at least one processor to perform the method according to claim 1.

9. The method according to claim 1, wherein a periodicity of the audio streaming noise and a periodicity of the data connection noise are different from each other and are multiples of each other.

10. The method according to claim 9, wherein the number of time samples is a product of the sample rate of the receiver and a largest periodicity from among the periodicity of the audio streaming noise and the periodicity of the data connection noise.

11. The method according to claim 1, wherein the periodicity of the noise signal is known in advance by the electronic device.

* * * * *